US006649431B2

(12) United States Patent
Merkulov et al.

(10) Patent No.: US 6,649,431 B2
(45) Date of Patent: Nov. 18, 2003

(54) CARBON TIPS WITH EXPANDED BASES GROWN WITH SIMULTANEOUS APPLICATION OF CARBON SOURCE AND ETCHANT GASES

(75) Inventors: Vladimir I. Merkulov, Knoxville, TN (US); Douglas H. Lowndes, Knoxville, TN (US); Michael A. Guillorn, Knoxville, TN (US); Michael L. Simpson, Knoxville, TN (US)

(73) Assignee: UT. Battelle, LLC, Oak Ridge, TN (US)

( * ) Notice: Subject to any disclaimer, the term of this patent is extended or adjusted under 35 U.S.C. 154(b) by 154 days.

(21) Appl. No.: 09/795,660

(22) Filed: Feb. 27, 2001

(65) Prior Publication Data

US 2002/0117951 A1 Aug. 29, 2002

(51) Int. Cl.[7] .............................................. H01L 21/00
(52) U.S. Cl. ............................ 438/20; 438/70; 438/22; 313/336; 445/49; 445/51; 257/13; 257/79; 423/445 R; 423/448
(58) Field of Search .................. 438/780, 20–22; 313/336; 445/49–51; 257/13, 79; 423/446, 447.1–447.9, 448

(56) References Cited

U.S. PATENT DOCUMENTS

| 5,663,608 A | * | 9/1997 | Jones et al. .................. 313/309 |
| 5,773,921 A | * | 6/1998 | Keesmann et al. .......... 313/309 |
| 5,804,910 A | * | 9/1998 | Tjaden et al. ................ 313/310 |
| 5,825,122 A | * | 10/1998 | Givargizov et al. ......... 313/336 |
| 6,020,677 A | * | 2/2000 | Blanchet-Fincher et al. ..... 313/336 |
| 6,132,278 A | * | 10/2000 | Kang et al. ..................... 445/14 |
| 6,261,532 B1 | * | 7/2001 | Ono ........................ 423/447.3 |
| 6,417,606 B1 | | 7/2002 | Nakamoto et al. ........... 313/336 |
| 2001/0008364 A1 | * | 7/2001 | Hu ............................. 313/496 |
| 2001/0034174 A1 | * | 10/2001 | Moore .......................... 445/24 |
| 2001/0040215 A1 | * | 11/2001 | Ahmed et al. ............... 250/307 |
| 2002/0033663 A1 | * | 3/2002 | Xu et al. ..................... 313/495 |
| 2002/0088938 A1 | * | 7/2002 | Colbert et al. .............. 250/306 |
| 2002/0117953 A1 | * | 8/2002 | Kuo et al. ................... 313/310 |

OTHER PUBLICATIONS

Y. Saito "Preparation and properties of carbon nanotubes" 1999 IEEE International symposium on micromechatronics and human science, 0–7803–5790–6/99 p. 43–49.*

Guillorn, et al., "Operation of a gated field emitter using an individual carbon nanofiber cathode," Applied Physics Letters, vol. 79, No. 21, pp. 3506–3508, Nov. 19, 2001.

Baylor, et al., "Field emission from isolated individual vertically aligned carbon nanocones" Journal of Applied Physics, vol. 91, No. 7, pp. 4602–4606, Apr. 1, 2002.

Saito et al., "Field Emission Patterns from Single–Walled Carbon Nanotubes," Japan Journal Applied Physics, vol. 36, pp. 1340–1342, Oct. 1, 1997.

Matsumoto, et al., "Ultralow biased field emitter using single–wall carbon nanotube directly grown onto silicon tip by thermal chemical vapor deposition," Applied Physics Letters, vol. 78, No. 4, pp. 539–540, Jan. 22, 2001.

(List continued on next page.)

Primary Examiner—Matthew Smith
Assistant Examiner—Granvill D Lee, Jr.
(74) Attorney, Agent, or Firm—Gray Cary Ware & Freidenrich, LLP (57) ABSTRACT

Systems and methods are described for carbon tips with expanded bases. A method includes producing an expanded based carbon containing tip including: fabricating a carbon containing expanded base on a substrate; and then fabricating a carbon containing fiber on the expanded base. An apparatus includes a carbon containing expanded base coupled to a substrate; and a carbon containing fiber coupled to said carbon containing expanded base.

29 Claims, 4 Drawing Sheets

OTHER PUBLICATIONS

Guillorn, et al., "Fabrication of gated cathode structures using an in situ grown vertical aligned carbon nanofiber as a field emission element", Journal of Vacuum Science, pp. 573–578, Mar./Apr. 2001.

Rinzler, et al., "Unraveling Nanotubes: Field Emission from an Atomic Wire" available at wwww.jstor.org, pp. 1550–1553, May 9, 2002.

Merkulov, et al., "Patterned growth of individual and multiple vertically aligned carbon nanofibers," Applied Physics Letters, vol. 76, No. 24, pp. 3555–3557, Jun. 12, 2000.

Xueping, et al., "A method for fabricating large–area, patterned, carbon nanotube field emitters," Applied Physics Letters, vol. 74, No. 17, pp. 2549–2551, Apr. 26, 1999.

Merkulov, et al., "Scanned–probe field–emmission studies of vertically aligned carbon nanofibers" Journal of Applied Physics, vol. 89, No. 3, pp. 1933–1937, Feb. 1, 2001.

Bonard, et all, "Field emission from single–wall carbon nanotube films" Applied Physics Letters, vol. 73, No. 7, pp. 918–920, Aug. 17, 1998.

Xueping, et al., "Carbon Nanotube–based vacuum microelectronic gated cathode," Material Research Society Symposium, vol. 509, pp. 107–109, 1998.

Dean, et al., "The environmental stability of field emission from single–walled carbon nanotubes" Applied Physics Letters, vol. 75, No. 19, pp. 3017–3019, Nov. 8, 1999.

Wang, et al., "Flat panel display prototype using gated carbon nanotube field emitters," Applied Physics Letters, vol. 78, No. 9, pp. 1294–1296, Feb. 26, 2001.

Lee, et al., "Realization of Gated Field Emitters for Electrophotonic Applications Using Carbon Nanotube Line Emitters Directly Grown into Submicrometer Holes," Advanced Materials Communications, vol. 13, No. 7, pp. 479–482, Apr. 4, 2001.

Guillorn, et al. "Microfabricated field emission devices using carbon nanofibers as cathode elements", Journal of Vaccuum Science Technology B19(6), pp. 2598–2601, Nov./Dec. 2001.

PCT International Search Report Date Mailed Sep. 17, 2002.

*Synthesis of Large Arrays of Well–Aligned Carbon Nanotubes on Glass* by Z.F. Ren, et al. Science Vo. 282, Nov. 6, 1998.

*Variations in Structure and Emission Characteristics of Nanostructured Carbon Films Prepared by HFCVD Method Due to the Addition of Ammonia in Source Gases*, by Seungho Choi, et al. Dept. of Molecular Science and Technology, Ajou University, Suwon 442–749 Korea. 2001 IEEE.

Baker, "Catalytic growth of carbon filaments," *Carbon*, 27:315–323, 1989.

Merkulov et al., "Patterned growth of individual and multiple vertically aligned carbon nanofibers," *Applied Physics Letters*, 76:3555–3557, 2000.

Ren et al., "Growth of a single freestanding multiwall carbon nanotube on each nanonickel dot," *Applied Physics Letters*, 75:1086–1088, 1999.

Ren et al., "Synthesis of large arrays of well–aligned carbon nanotubes on glass," *Science*, 282:1105–1107, 1998.

* cited by examiner

CARBON TIPS WITH EXPANDED BASES GROWN WITH SIMULTANEOUS APPLICATION OF CARBON SOURCE AND ETCHANT GASES

STATEMENT AS TO RIGHTS TO INVENTIONS MADE UNDER FEDERALLY-SPONSORED RESEARCH AND DEVELOPMENT

This invention was made with United States Government support under contract to UT-Battelle, LLC. The Government has certain rights in this invention.

BACKGROUND OF THE INVENTION

1. Field of the Invention

The invention relates generally to the field of carbon tips. More particularly, a preferred implementation of the invention relates to carbon tips with expanded bases. The invention thus relates to carbon tips of the type that can be termed expanded base.

2. Discussion of the Related Art

There are many technological/scientific tools and devices that utilize sharp tips with high aspect ratio. They include scanning probe microscopy, biological probes, field emission (FE) devices, etc. Tip requirements for the above applications include extreme sharpness and a high aspect ratio, combined with mechanical stability as well as chemical inertness and resistance to sputtering. The preferred tip shape is a cylinder because it enables higher resolution when measuring high aspect ratio features and also provides a substantially higher field enhancement at the apex of the tip as compared to other geometries, thereby enabling field emission of electrons at low applied fields.

Vertically-aligned carbon nanotubes (VACNTs) and nanofibers (VACNFs) are materials that possess a number of unique properties that make them well suited for the use as tips. First, VACNTs and VACNFs have intrinsically small diameters (~1 nm for single-wall CNTs). Second, VACNTs/VACNFs have very high aspect ratios and cylindrical shape. Third, VACNTs/VACNFs exhibit high mechanical strength and flexibility. Fourth, some VACNTs and all VACNFs are electrically conducting which permits their use when current measurements and electron field emission are involved (scanning tunneling microscopy, FE (field effect) devices, biological probes). Fifth, VACNTs/VACNFs are chemically inert and highly sputter resistant. Finally, VACNFs can be grown at predetermined locations (deterministic growth), which enables their incorporation into actual devices.

The growth process of forests of randomly placed vertically aligned carbon nanofibers (VACNFs) was first pioneered by Ren et al. (1). Later on, our group (2) and Ren et al.(3) independently developed a method for deterministic growth of individual VACNFs.

However, there is a significant obstacle associated with the use of high-aspect-ratio cylindrical tips. As the aspect ratio increases, the very ends of these tips exhibit significant thermal and mechanical vibrations. Therefore, what is needed is a solution that provides a high-aspect-ratio cylindrical tip that is thermal and mechanical vibration resistant. What is also needed are carbon tips having improved quality and reduced cost.

SUMMARY OF THE INVENTION

There is a need for the following embodiments. Of course, the invention is not limited to these embodiments.

One embodiment of the invention is based on a method, comprising producing an expanded base carbon containing tip including: fabricating a carbon containing expanded base on a substrate; and then fabricating a carbon containing extension on the expanded base. Another embodiment of the invention is based on an apparatus, comprising: a carbon containing expanded base coupled to a substrate; and a carbon containing extension coupled to said carbon containing expanded base.

These, and other, embodiments of the invention will be better appreciated and understood when considered in conjunction with the following description and the accompanying drawings. It should be understood, however, that the following description, while indicating various embodiments of the invention and numerous specific details thereof, is given by way of illustration and not of limitation. Many substitutions, modifications, additions and/or rearrangements may be made within the scope of the invention without departing from the spirit thereof, and the invention includes all such substitutions, modifications, additions and/or rearrangements.

BRIEF DESCRIPTION OF THE DRAWINGS

The drawings accompanying and forming part of this specification are included to depict certain aspects of the invention. A clearer conception of the invention, and of the components and operation of systems provided with the invention, will become more readily apparent by referring to the exemplary, and therefore nonlimiting, embodiments illustrated in the drawings, wherein like reference numerals designate the same elements. The invention may be better understood by reference to one or more of these drawings in combination with the description presented herein. It should be noted that the features illustrated in the drawings are not necessarily drawn to scale.

DESCRIPTION OF PREFERRED EMBODIMENTS

The invention and the various features and advantageous details thereof are explained more fully with reference to the nonlimiting embodiments that are illustrated in the accompanying drawings and detailed in the following description. Descriptions of well known components and processing techniques are omitted so as not to unnecessarily obscure the invention in detail. It should be understood, however, that the detailed description and the specific examples, while indicating preferred embodiments of the invention, are given by way of illustration only and not by way of limitation. Various substitutions, modifications, additions and/or rearrangements within the spirit and/or scope of the underlying inventive concept will become apparent to those skilled in the art from this detailed description.

Within this application several publications are referenced by superscripts composed of Arabic numerals within parentheses. Full citations for these, and other, publications may be found at the end of the specification immediately preceding the claims after the section heading References. The disclosures of all these publications in their entireties are hereby expressly incorporated by reference herein for the purpose of indicating the background of the invention and illustrating the state of the art.

The below-referenced U.S. Patent, and U.S. Patent Application disclose embodiments that were satisfactory for the purposes for which they are intended. The entire contents of U.S. Pat. No. 6,078,392 are hereby expressly incorporated by reference herein for all purposes. The entire contents of U.S. patent application Ser. No. 09/368,919, filed Aug. 5, 1999 are hereby expressly incorporated by reference herein for all purposes.

A conically shaped tip has fewer thermal and mechanical vibration problems compared to a cylindrical tip due to the much higher mechanical and thermal stability provided by the wider base. However, compared to a cylindrical tip, a conically shaped tip has substantially lower resolution for measuring high aspect ratio features and requires higher electric fields for electron emission. Therefore, the truly ideal tip shape is a cylinder sitting on top of a cone. This cylinder-on-cone structure combines mechanical stability of the cone and the advantage of the cylinder for high resolution measurements and field emission at low applied fields, thus yielding a perfect tip shape.

The invention can include one or more nanoscale carbon tips with cylinder-on-cone shapes. The phrase cylinder-on-cone is defined as a composite shape composed of a substantially cylindrical symmetric rod that extends substantially coaxially away from near the apex of a substantially cylindrically symmetric cone. These composite shapes can be solid (cone and rods) and/or hollow (funnels and tubes).

The invention can include a method for fabrication of nanoscale cylinder-on-cone carbon shapes that can be used as tips in a variety of applications. Perpendicularly oriented nanoscale cylinder-on-cone carbon tips (NCCCTs) can be grown directly at predetermined locations on a substrate. This method of production allows for fabrication of substantially ideally shaped tips with precise control of position. This method of production is well suited for large-scale commercial production. This method can utilize a combination of electron-beam lithography (EBL) and plasma-enhanced chemical vapor deposition (PE-CVD). Both of these techniques are well developed, do not require complicated manipulations, and are well suited for large-scale commercial production. The fabrication process allows growth of NCCCTs at pre-determined locations on a substrate and yields mechanically strong connection between the base of NCCCTs and the substrate. It also enables precise and accurate control of the crucial NCCCT parameters such as the length of the cone and the cylinder, the cone angle, and the diameter of the NCCCT apex. Consequently, NCCCTs can be tailored to perfectly suit specific applications.

The method can include two main steps: formation of a precisely placed single metal catalyst dot on a substrate by utilizing EBL in conjunction with electron-gun metal evaporation; and catalytic growth of a NCCCT on the substrate using PE-CVD.

Growth of CNTs and CNFs requires the presence of a catalytic precursor. Ni can be used as a catalyst. However, other metals such as Fe, Co, etc. can also be utilized as the catalyst with these procedures, the results being similar.

Figure 1A:
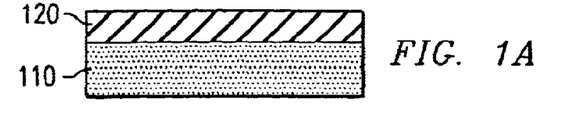
FIGS. 1A–1F illustrate schematic views of a process, representing an embodiment of the invention.
Figure 1B:
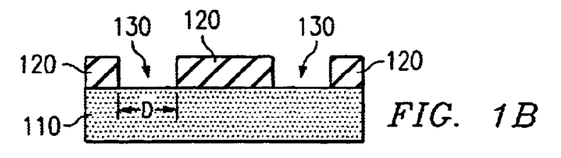
Figure 1C:
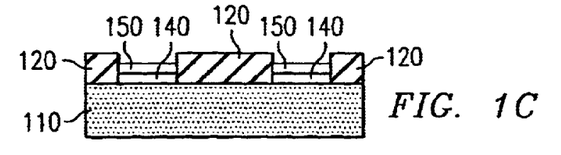
Figure 1D:
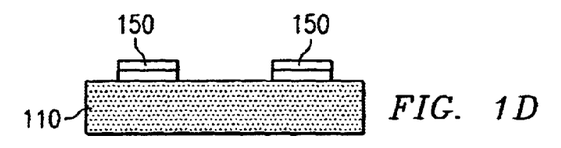

In order to grow a single carbon nanocone (CNC) or CNF, formation of a single catalyst nanoparticle (or cluster) may be required. This catalyst nanoparticle is formed by forming a metal catalyst dot with width (diameter) D, and film thickness, T. FIGS. 1A–1F show fabrication of vertically aligned carbon nanofibers (VACNFs) utilizing plasma enhanced chemical vapor deposition (FIGS. 1E–1F) preceded by electron-beam lithography and metal evaporation (FIGS. 1A–1D). A catalyst dot 150 is fabricated on a substrate using electron beam (e-beam) lithography and electron gun (e-gun) metal evaporation as shown in FIGS. 1A–1D. A substrate 110 is first coated with an e-beam resist 120 (e.g. PMMA); the resist 120 is then e-beam exposed and developed (FIGS. 1A and 1B), to produce a small opening 130 in the resist 120 with width (diameter) D. A buffer layer 140 (Ti in this case) is deposited next to prevent the formation of catalyst silicide and to impede catalyst diffusion at elevated temperatures. Next, a catalyst layer 150 (Ni, in this case) is deposited (FIG. 1C). Finally, a single, isolated catalyst dot is obtained by lifting off the metal-coated resist in acetone (FIG. 1D). Multiple dots, or pattern arrays of dots, also can be produced by this process.

Figure 1E:
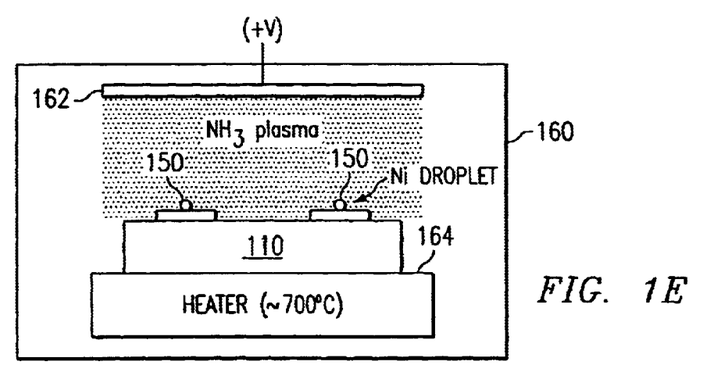
Figure 1F:
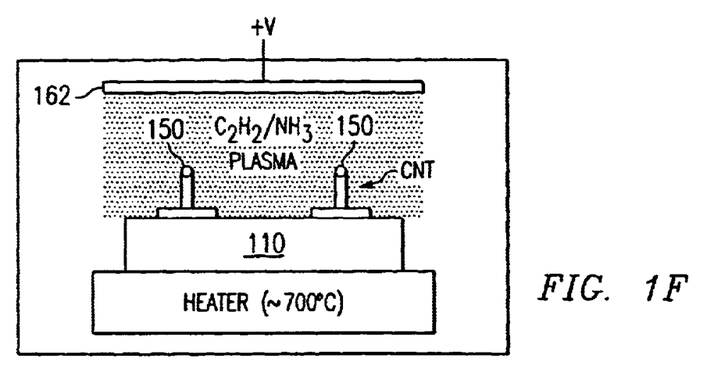

FIGS. 1E–1F show a VACNF is prepared by PECVD in a vacuum chamber 160. The vacuum chamber 160 can include an anode 162 and a cathode 164. The cathode 164 can also function as a heater. One of the advantages of this method is that high vacuum is not required, i.e. the chamber 160 can be evacuated using only a mechanical pump (FIGS. 1E and 1F). Upon ammonia plasma pre-etching (alternatively, hydrogen and other gases can be used) and annealing the Ni/Ti assembly on Si at the elevated temperatures required to grow VACNFs (~700° C. in this case), the Ti layer 140 continues to adhere to the Si substrate 110, whereas the initially continuous Ni layer 150 breaks into one or more little nanoparticle droplets (FIG. 1E).

Figure 2A:
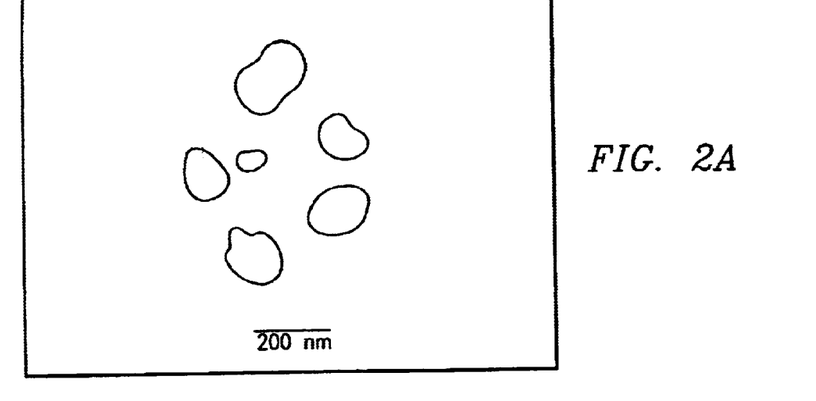
FIGS. 2A–2D illustrate scanning electron micrographs of single (b and d) and multiple (a and c) vertically aligned carbon nanofibers, representing embodiments of the invention.
Figure 2B:
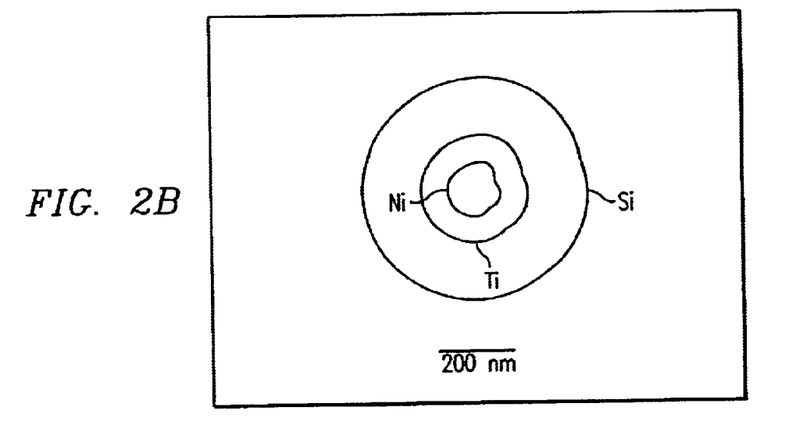

FIGS. 2A–2D show scanning electron microscopy images of single and multiple vertically aligned carbon nanofibers formed from a single or multiple catalyst dot. Upon heating and ammonia plasma pre-etching the catalyst layer breaks into nanodroplets. Each nanodroplet provides for catalytic growth of an individual nanofiber. This droplet is the necessary precursor for the catalytic growth of a single VACNF at this predetermined location. Within an initially large dot, multiple droplets are formed (FIG. 2A). See FIG. 2B also. However, below a critical dot size only a single nanoscale Ni droplet forms (FIG. 2B) and consequently only a single nanofiber is grown. See FIG. 2D also. The critical dot size, and the size of its resulting Ni droplet, will depend upon the choice of the buffer layer between the catalyst and the substrate, the type and thickness of the catalyst used, and the annealing/growth temperature. For example, for growth of a single VACNF at 700° C. using an initially 15 nm thick Ni catalyst on a Ti buffer layer on Si, the critical dot size (diameter) is ~350 nm. The diameter of the Ni nanoparticle droplet formed is about a factor of 3 smaller, ~100 nm in this example. Smaller catalyst nanoparticles can be obtained by initially forming a smaller catalyst dot. For instance, 100 nm dots with a 10 nm thick Ni layer produce Ni droplet of 30–40 nm in diameter, and 50 nm dots yield 20–30 nm droplets.

For VACNF growth, a mixture of a carbonaceous gas and an etchant (e.g., acetylene and ammonia) can be used as the gas source. The etchant is needed to etch away graphitic carbon film that continuously forms during the growth from the plasma discharge. If not removed, the role of the film will be passivating the catalyst and thereby preventing the formation of VACNFs. The invention can include heating the substrates directly by placing them on a heater plate (e.g., the cathode of the plasma discharge). This technique has the advantages that (i) it can easily be scaled up for large-area deposition and (ii) the substrate temperature is known and easily controlled. For example, an array of dots could be patterned as described here and then placed on the heater plate to simultaneously grow all of the (highly uniform) VACNFs.

Figure 2C:
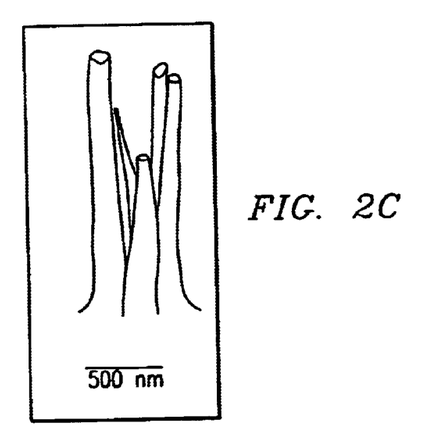
Figure 2D:
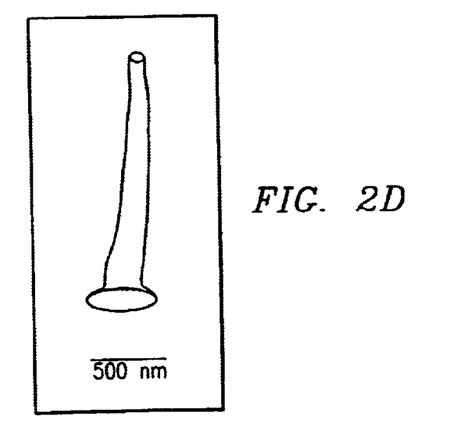

Just prior to the VACNF growth process, ammonia can be introduced into the chamber and a plasma created (FIG. 1F). The invention can utilize a dc (direct current) glow discharge plasma. However, radio-frequency (rf) or microwave plasmas also can be employed. After the plasma is started, acetylene can be introduced and the VACNF growth can begin. Each Ni (nickel) droplet initiates the formation of an individual VACNF (FIGS. 2C and 2D). The Ni droplet can reside on top of the VACNF and provides for its continued catalytic growth upwards (4). The VACNFs are oriented along plasma field lines and normally grow perpendicular to the substrate.

Figure 3A:
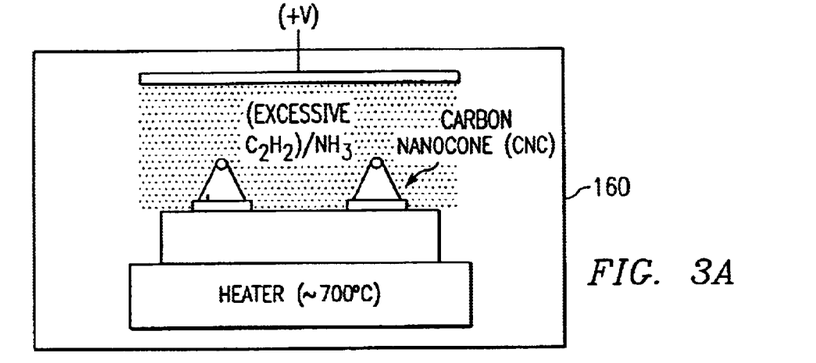
FIGS. 3A–3B illustrate schematic views of a process, representing an embodiment of the invention.

The invention can include adjusting the growth parameters, such as the ratio of acetylene to ammonia. In this way, a CNC rather than a CNF can be formed. Herein the word "nano" is referred to the tip diameter of the CNCs; the CNC height and base diameter can be grown to a $\mu$m size. If the acetylene content is increased relative to that of ammonia (in addition to just diffusing through the Ni particle and precipitating at its bottom, thus providing for the growth in the vertical direction) carbon also begins to precipitate at the walls of the growing, initially cylindrical VACNF. Precipitation occurs due to the insufficient amount of the etchant (ammonia), which leads to the deposition rate of carbon being higher than the etching rate. Thus growth in two dimensions (vertical due to the catalytic growth through the Ni particle and lateral due to the carbon precipitation at the walls) occurs. As a result, a conical structure forms, as shown in FIG. 3A. The tip diameter of the cone remains constant during the growth process and is determined only by the size of the catalyst droplet. In contrast, at a given acetylene content the base diameter of the CNC increases with growth time. Furthermore, by changing growth parameters, such as the relative acetylene content, the cone angle can be changed. Higher acetylene content and higher pressure yield higher cone angles and vice versa. The CNC height is proportional to the growth time.

The invention can also include a process in which a carbon cylinder (VACNF) is grown directly on a CNC in situ by changing the growth parameters during the synthesis process. As soon as a CNC of desired length and shape (cone angle) is obtained, the relative acetylene content in the chamber can be reduced to suppress the carbon growth in the lateral dimension, thus yielding the formation of a regular VACNF that has cylindrical shape and resides on top of the CNC. Again, the tip diameter of the VACNF is determined only by the catalyst droplet size and the length is controlled by the growth time.

Figure 3B:
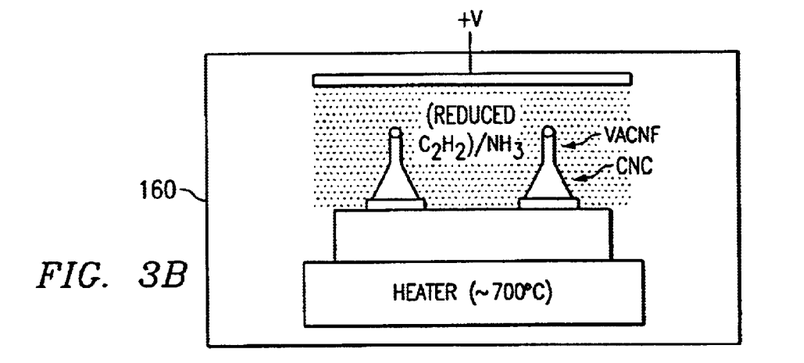

FIG. 3A shows growth of carbon nanocones in excess of acetylene. FIG. 3B shows subsequent growth of carbon nanofibers at the ends of the nanocones as the relative acetylene content is reduced during the growth process.

A method for controlled synthesis of NCCCTs can include three steps. The first step can be formation of a precisely placed single metal catalyst dot (or an array of dots) on a substrate by utilizing EBL in conjunction with electron-gun metal evaporation. The second step can be catalytic growth of a vertically oriented carbon nanocone on the substrate using PECVD with excess of a carbonaceous gas (e.g., acetylene in this work). The third step can be changing the growth parameters (e.g., relative acetylene content) during the growth process to synthesize a nanocylinder (VACNF) at the end of the nanocone.

The method enables substantially completely deterministic growth of CCCN tips, as the location of the tip, the length of the cone and the cylinder, the cone angle, and the diameter of the cylindrical part can all be controlled. Also, an important aspect of this process is its scalability for large-scale synthesis, which enables commercial mass production.

The invention can include the use of different carbon source gasses (e.g., ethelyne or methaene ). Similarly, the invention can include the use of different etchant gases (e.g., hydrogen). The key is to have a source of carbon and an etchant.

The transition from expanded base growth to fiber growth can be effected by changing growth parameters other than the relative acetylene content, e.g. plasma power, discharge voltage, total pressure in the chamber, and the growth temperature, can be used to change the shape of the tip (nancone-to-nanofiber transition). The key is to adjust the growth parameters to achieve carbon precipitation at the walls of the growing carbon nanofiber, thereby creating a cylindrical structure.

The invention can also utilize data processing methods that transform signals from the structures being grown to control the growth process. For example, the invention can be combined with instrumentation to obtain state variable information to actuate interconnected discrete hardware elements. For instance, the invention can include the use of data from detecting a laser beam reflected at the tips to control the growth of the tips. Similarly, the invention can include the use of electron emission detection data to control the growth of the tips.

The term approximately, as used herein, is defined as at least close to a given value (e.g., preferably within 10% of, more preferably within 1% of, and most preferably within 0.1% of). The term substantially, as used herein, is defined as at least approaching a given state (e.g., preferably within 10% of, more preferably within 1% of, and most preferably within 0.1% of). The term coupled, as used herein, is defined as connected, although not necessarily directly, and not necessarily mechanically. The term deploying, as used herein, is defined as designing, building, shipping, installing and/or operating. The term means, as used herein, is defined as hardware, firmware and/or software for achieving a result. The term program or phrase computer program, as used herein, is defined as a sequence of instructions designed for execution on a computer system. A program, or computer program, may include a subroutine, a function, a procedure, an object method, an object implementation, an executable application, an applet, a servlet, a source code, an object code, a shared library/dynamic load library and/or other sequence of instructions designed for execution on a computer system. The terms including and/or having, as used herein, are defined as comprising (i.e., open language). The terms a or an, as used herein, are defined as one or more than one. The term another, as used herein, is defined as at least a second or more.

The particular manufacturing process used for expanded base tips should be inexpensive and reproducible. Conveniently, the expanded base tips of the invention can be carried out by using any vacuum deposition method. It is preferred that the process be chemical vapor deposition. For the manufacturing operation, it is an advantage to employ a plasma enhanced technique.

However, the particular manufacturing process used for the expanded base tips is not essential to the invention as long as it provides the described functionality. Normally those who make or use the invention will select the manufacturing process based upon tooling and energy requirements, the expected application requirements of the final product, and the demands of the overall manufacturing process.

The particular material used for the expanded base tips should be substantially pure. Conveniently, the expanded base tips of the invention can be made of any source of carbon material. It is preferred that the material be gaseous. For the manufacturing operation, it is an advantage to employ an alkene or alkine material.

However, the particular material selected for producing the expanded base tips is not essential to the invention, as long as it provides the described function. Normally, those who make or use the invention will select the best commercially available material based upon the economics of cost and availability, the expected application requirements of the final product, and the demands of the overall manufacturing process.

The disclosed embodiments show a plasma discharge vacuum chamber as the structure for performing the function of fabricating the expanded base tips, but the structure for fabrication of tips can be any other structure capable of performing the function of fabrication, including, by way of example a simple chemical vapor deposition chamber or a physical vapor deposition chamber.

EXAMPLES

Specific embodiments of the invention will now be further described by the following, nonlimiting examples which will serve to illustrate in some detail various features. The following examples are included to facilitate an understanding of ways in which the invention may be practiced. It should be appreciated that the examples which follow represent embodiments discovered to function well in the practice of the invention, and thus can be considered to constitute preferred modes for the practice of the invention. However, it should be appreciated that many changes can be made in the exemplary embodiments which are disclosed while still obtaining like or similar result without departing from the spirit and scope of the invention. Accordingly, the examples should not be construed as limiting the scope of the invention.

Example 1

Figure 4A:
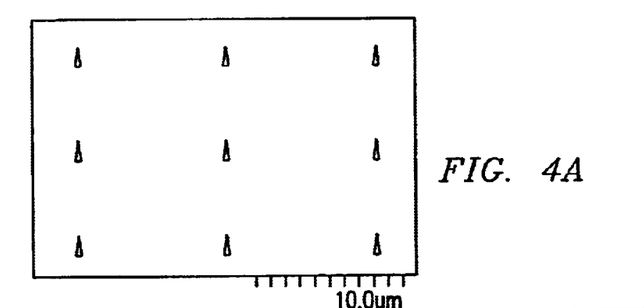
FIGS. 4A–4C illustrate scanning electron micrographs of carbon nanocones, representing embodiments of the invention.
Figure 4B:
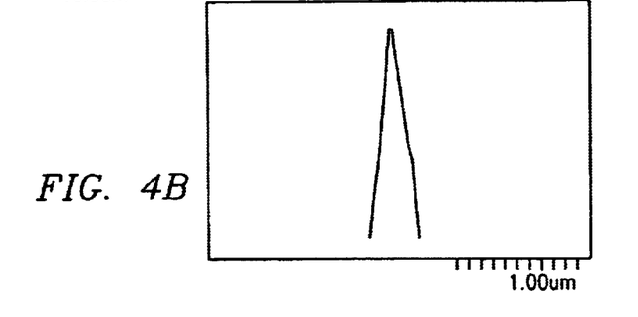
Figure 4C:
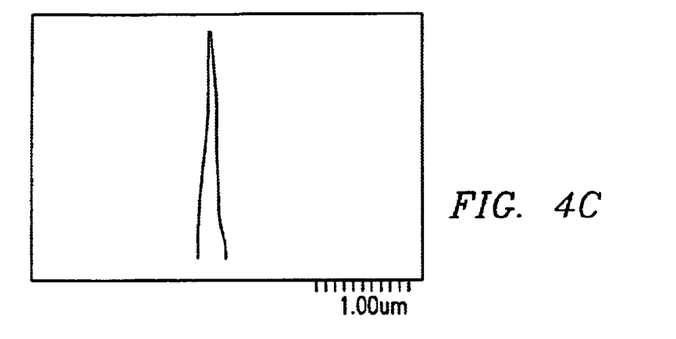

An example of a CNC array and CNCs with different cone angles are shown in FIG. 4. FIGS. 4A–4C show an array of carbon nanocones (a) fabricated using plasma-enhanced chemical vapor deposition with excess of carbonaceous gas (acetylene). Carbon nanocones with (b) large and (c) small cone angles grown with gas flows of 60 sccm $C_2H_2$/80 sccm $NH_3$ and 55 sccm $C_2H_2$/80 sccm $NH_3$, correspondingly.

Example 2

Figure 5A:
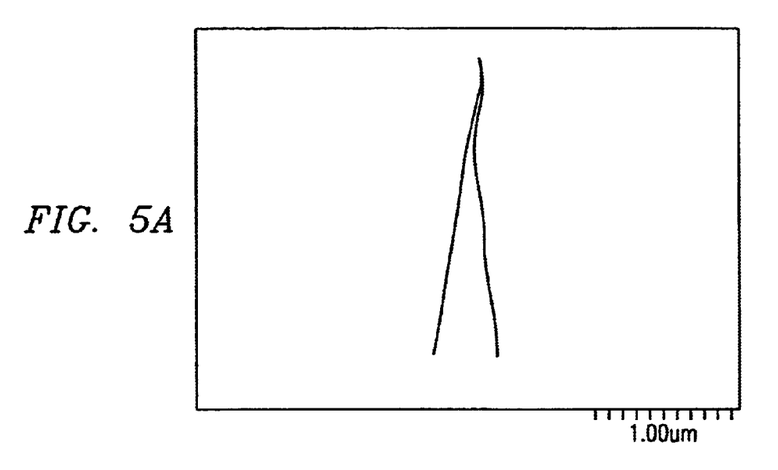
FIGS. 5A–5B illustrate scanning electron micrographs of cylinder-on-cone carbon tips, representing embodiments of the invention.
Figure 5B:
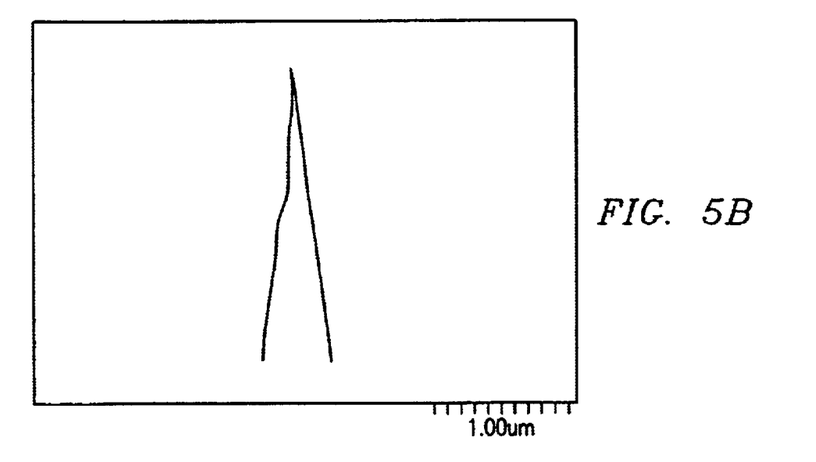

An example of resultant nanoscale cylinder-on-cone carbon tips (NCCCTs) is shown in FIGS. 5A and 5B. FIGS. 5A and 5B show nanoscale cylinder-on-cone carbon tips (NCCCTs) synthesized by first growing carbon nanocone in excess of acetylene (60 sccm $C_2H_2$/80 sccm $NH_3$) and then growing carbon nanofiber by reducing the relative acetylene content (50 sccm $C_2H_2$/80 sccm $NH_3$) during the growth process. Referring to FIG. 5A, a carbon containing expanded base 510 includes a precipitated graphitic carbon film 520. Growing the carbon containing expanded base 510 includes simultaneously applying a carbon source gas and an etchant gas to said carbon containing expanded base 510 and growing said carbon containing extension includes simultaneously applying the carbon source gas and the etchant gas to said carbon containing extension.

Practical Applications of the Invention

Practical applications of the invention that have value within the technological arts include atomic force microscopy (AFM), scanning tunneling microscopy (STM), and other scanning probe microscopies; field emission devices; biological probes; any other techniques where sharp tips are utilized. There are virtually innumerable uses for the invention, all of which need not be detailed here.

Advantages of the Invention

A carbon tip and/or electron emitter, representing an embodiment of the invention, can be cost effective and advantageous for at least the following reasons. The invention allows to fabricate nanoscale cylinder-on-cone carbon tips (NCCCTs), not just cylindrical tips such as vertically aligned carbon nanofibers or nanotubes. The crucial tip parameters such as the length of the cone and the cylinder, the cone angle, and the diameter of the cylindrical part can be well controlled. This allows tailoring NCCCTs to meet specific applications. The invention improves quality and/or reduces costs compared to previous approaches.

All the disclosed embodiments of the invention disclosed herein can be made and used without undue experimentation in light of the disclosure. Although the best mode of carrying out the invention contemplated by the inventor(s) is disclosed, practice of the invention is not limited thereto. Accordingly, it will be appreciated by those skilled in the art that the invention may be practiced otherwise than as specifically described herein.

Further, the individual components need not be formed in the disclosed shapes, or combined in the disclosed configurations, but could be provided in virtually any shapes, and/or combined in virtually any configuration. Further, the individual components need not be fabricated from the disclosed materials, but could be fabricated from virtually any suitable materials.

Further, variation may be made in the steps or in the sequence of steps composing methods described herein. Further, homologous replacements may be substituted for the substances described herein. Further, agents which are chemically related may be substituted for the agents described herein where the same or similar results would be achieved.

Further, although the carbon tip(s) and/or electron emitter (s) described herein can be a separate module, it will be manifest that the carbon tip(s) and/or electron emitter(s) may be integrated into the system with which it is (they are) associated. Furthermore, all the disclosed elements and features of each disclosed embodiment can be combined with, or substituted for, the disclosed elements and features of every other disclosed embodiment except where such elements or features are mutually exclusive.

It will be manifest that various substitutions, modifications, additions and/or rearrangements of the features of the invention may be made without deviating from the spirit and/or scope of the underlying inventive concept. It is deemed that the spirit and/or scope of the underlying inventive concept as defined by the appended claims and their equivalents cover all such substitutions, modifications, additions and/or rearrangements.

The appended claims are not to be interpreted as including means-plus-function limitations, unless such a limitation is explicitly recited in a given claim using the phrase(s) "means for" and/or "step for." Subgeneric embodiments of the invention are delineated by the appended independent claims and their equivalents. Specific embodiments of the invention are differentiated by the appended dependent claims and their equivalents.

REFERENCES

1. Ren, Huang, Xu, Wang, Bush, Siegal, Provencio, "Synthesis of Large Arrays of Well-Aligned Carbon Nanotubes on Glass," *Science,* 282:1105, 1998.
2. Merkulov, Lowndes, Wei, Eres, Voelkl, "Patterned Growth of Individual and Multiple Vertically Aligned Carbon Nanofibers," *Appl. Phys. Lett.,* 76:3555, 2000.
3. Ren, Huang, Wang, Wen, Xu, Wang, Calvet, Chen, Klemic, Reed, "Growth of a Single Freestanding Multiwall Carbon Nanotube on Each Nanonickel Dot," *Appl. Phys. Lett.,* 75:1086, 1999.
4. Baker, "Catalytic Growth of Carbon Filaments," *Carbon,* 27:325, 1989.

What is claimed is:

1. A method, comprising producing an expanded base carbon containing tip including:
   growing a carbon containing expanded base on a substrate; then
   transitioning from growing said carbon containing expanded base to growing a carbon containing extension by adjusting at least one growth parameter selected from the group consisting of a ratio of carbon source gas to etchant gas, a plasma power, a discharge voltage, a process pressure and a process temperature; and then
   growing the carbon containing extension on the expanded base,
   wherein i) growing said carbon containing expanded base includes simultaneously applying a carbon source gas and an etchant gas to said carbon containing expanded base and ii) growing said carbon containing extension includes simultaneously applying the carbon source gas and the etchant gas to said carbon containing extension and the carbon containing expanded base includes a precipitated graphitic carbon film.

2. The method of claim 1, wherein growing said carbon containing extension includes growing said carbon containing extension on an apex of said carbon containing expanded base.

3. The method of claim 1, further comprising providing a catalyst that is coupled to said substrate before growing said carbon containing expanded base.

4. The method of claim 3, wherein the catalyst includes at least one member selected from the group consisting of nickel, iron and cobalt.

5. The method of claim 3, wherein providing a catalyst includes coating said substrate with an electron beam resist, patterning said electron beam resist, depositing a buffer layer on said substrate, depositing said catalyst on said buffer layer, and removing said electron beam resist.

6. The method of claim 3, further comprising heating said catalyst to form multiple catalyst droplets.

7. The method of claim 1, wherein transitioning from growing said carbon containing expanded base to growing said carbon containing extension includes changing the ratio of carbon source gas to etchant gas.

8. The method of claim 1, wherein transitioning includes reducing the ratio of carbon source gas to etchant gas to effect a transition from expanded base growth to extension growth.

9. The method of claim 1, wherein transitioning includes lowering the process pressure to effect a transition from expanded base growth to extension growth.

10. The method of claim 1, wherein transitioning includes changing the plasma power to effect a transition from expanded base growth to extension growth.

11. The method of claim 1, wherein transitioning includes changing the discharge voltage to effect a transition from expanded base growth to extension growth.

12. The method of claim 1, wherein transitioning includes changing the process temperature to effect a transition from expanded base growth to extension growth.

13. An electron emitter made by the method of claim 1.

14. A method, comprising producing an expanded base carbon containing tip including:
   growing a carbon containing expanded base on a substrate; and then
   growing a carbon containing extension on the carbon containing expanded base,
   wherein i) growing said carbon containing expanded base includes simultaneously applying a carbon source gas and an etchant gas to said carbon containing expanded base at a first carbon source gas to etchant gas ratio and ii) growing said carbon containing extension includes simultaneously applying the carbon source gas and the etchant gas to said carbon containing extension at a second carbon source gas to etchant gas ratio that is lower than the first carbon source gas to etchant gas ratio.

15. The method of claim 14 wherein growing includes chemical vapor deposition.

16. The method of claim 15, wherein growing includes plasma enhanced chemical vapor deposition.

17. The method of claim 16, wherein growing includes heating said substrate with a cathode to which said substrate is coupled.

18. The method of claim 16, wherein growing includes at least one technique selected from the group consisting of dc glow discharge plasma enhanced chemical vapor deposition, radio-frequency plasma enhanced chemical vapor deposition and microwave plasma enhanced chemical vapor deposition.

19. The method of claim 14, wherein the carbon source gas includes acetylene and the etchant gas includes ammonia.

20. An apparatus, comprising an expanded base carbon containing tip including:
   a carbon containing expanded base coupled to a substrate; and
   a carbon containing extension coupled to said carbon containing expanded base, wherein the carbon containing expanded base includes a precipitated graphitic carbon film.

21. The apparatus of claim 20, wherein said carbon containing expanded base is substantially cylindrically symmetrical and said carbon containing extension is substantially cylindrically symmetrical.

22. The apparatus of claim 21, wherein said carbon containing expanded base is substantially conical.

23. The apparatus of claim 22, wherein said carbon containing expanded base defines a substantially solid cone.

24. The apparatus of claim 22, wherein said carbon containing expanded base defines a substantially hollow funnel.

25. The apparatus of claim 21, wherein said carbon containing extension is substantially cylindrical.

26. The apparatus of claim 25, wherein said carbon containing extension defines a substantially solid rod.

27. The apparatus of claim 25, wherein said carbon containing extension defines a substantially hollow tube.

28. The apparatus of claim 20, further comprising another expanded base carbon containing tip coupled to said substrate, the another expanded base carbon containing tip including another carbon containing expanded base coupled to said substrate; and another carbon containing extension coupled to the another carbon containing expanded base, the another carbon containing expanded base including another precipitated graphitic carbon film.

29. An electron emitter, comprising the apparatus of claim 20.

* * * * *